(12) United States Patent
O'Keeffe et al.

(10) Patent No.: US 11,416,800 B2
(45) Date of Patent: Aug. 16, 2022

(54) SYSTEM AND METHOD FOR COMPARING ENTERPRISE PERFORMANCE USING INDUSTRY CONSUMER DATA IN A NETWORK OF DISTRIBUTED COMPUTER SYSTEMS

(71) Applicant: TrueCar, Inc., Santa Monica, CA (US)

(72) Inventors: Christopher James O'Keeffe, Oak Park, CA (US); Michael D. Swinson, Santa Monica, CA (US); Ludovica Rizzo, Los Angeles, CA (US); Daniel Salazar, Round Rock, TX (US)

(73) Assignee: TrueCar, Inc., Santa Monica, CA (US)

( * ) Notice: Subject to any disclaimer, the term of this patent is extended or adjusted under 35 U.S.C. 154(b) by 1070 days.

(21) Appl. No.: 16/034,176

(22) Filed: Jul. 12, 2018

(65) Prior Publication Data
US 2019/0019131 A1    Jan. 17, 2019

Related U.S. Application Data

(60) Provisional application No. 62/533,442, filed on Jul. 17, 2017, provisional application No. 62/532,181, filed on Jul. 13, 2017.

(51) Int. Cl.
*G06Q 10/06* (2012.01)
*G06Q 30/02* (2012.01)

(52) U.S. Cl.
CPC ... *G06Q 10/06393* (2013.01); *G06Q 30/0205* (2013.01)

(58) Field of Classification Search
CPC ............... G06Q 10/06393; G06Q 30/0205
(Continued)

(56) References Cited

U.S. PATENT DOCUMENTS

| | | | |
|---|---|---|---|
| 8,938,686 B1* | 1/2015 | Erenrich | G06F 40/143 715/781 |
| 2006/0136462 A1* | 6/2006 | Campos | G06F 16/285 707/999.102 |

(Continued)

OTHER PUBLICATIONS

T. T. Lin, C. C. Lee and F. T. Chang, "A performance management on automobile dealers with applying data envelopment analysis," 2010 IEEE International Conference on Industrial Engineering and Engineering Management, 2010, pp. 380-384, doi: 10.1109/IEEM.2010.5674607.*

(Continued)

*Primary Examiner* — Timothy Padot
(74) *Attorney, Agent, or Firm* — Sprinkle IP Law Group

(57) ABSTRACT

Systems, method and computer program products for presenting to a user a visualization of a vehicle dealer performance assessment based on dealer location and vehicle sales transaction data, where the assessment is based on geographically normalized metrics. Dealer location data and historical vehicle sales transaction data is collected by a in a vehicle data system from external data sources. Distances from dealers to geographical regions of interest are determined, and differences between these distances are normalized to produce competition zone indices for the geographical regions. The competition zone indices are then used to aggregate the geographical regions into different competition zones in which dealers of interest have corresponding levels of competitive advantage or disadvantage, normalized according to typical distances associated with transactions in the respective geographical regions.

20 Claims, 6 Drawing Sheets

(58) Field of Classification Search
USPC .......................................................... 705/7.34
See application file for complete search history.

(56) References Cited

U.S. PATENT DOCUMENTS

| | | | | |
|---|---|---|---|---|
| 2009/0248490 | A1* | 10/2009 | Moncreiff | G06Q 30/0201 |
| | | | | 705/7.34 |
| 2015/0032685 | A1* | 1/2015 | Lingappa | G06Q 10/063 |
| | | | | 707/603 |
| 2015/0310466 | A1* | 10/2015 | LaCivita | G06Q 10/087 |
| | | | | 705/7.34 |
| 2016/0253682 | A1* | 9/2016 | Inman | G06Q 30/0201 |
| | | | | 705/7.29 |

OTHER PUBLICATIONS

Research framework, strategies, and applications of intelligent agent technologies (IATs) in marketing. Kumar, V; Dixit, Ashutosh; Javalgi, Rajshekar (raj); G; Dass, Mayukh. Journal of the Academy of Marketing Science 44.1: 24-45. Springer Nature B.V. (Jan. 2016).*

* cited by examiner

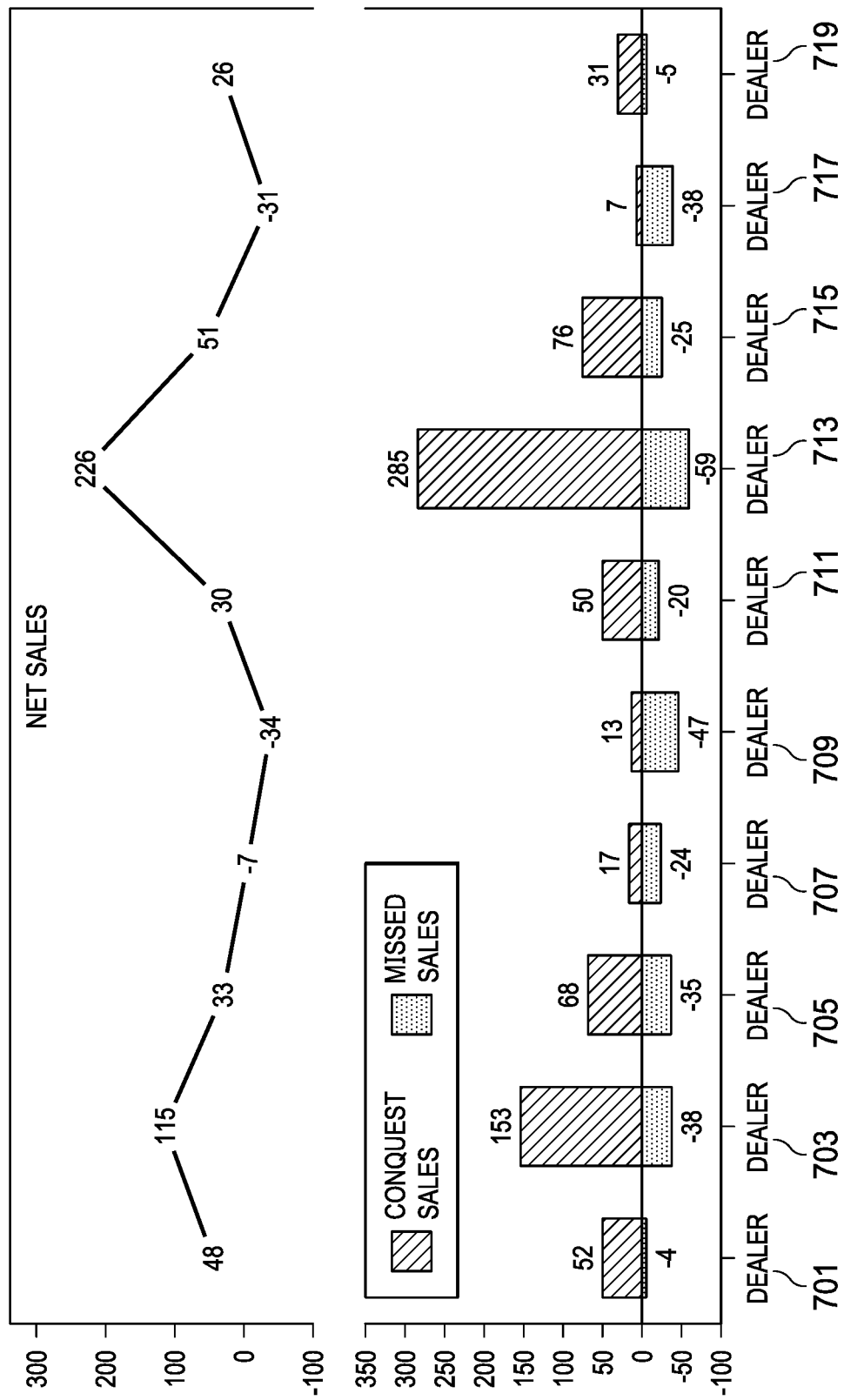

SYSTEM AND METHOD FOR COMPARING ENTERPRISE PERFORMANCE USING INDUSTRY CONSUMER DATA IN A NETWORK OF DISTRIBUTED COMPUTER SYSTEMS

CROSS-REFERENCE TO RELATED APPLICATIONS

This is a conversion of, and claims a benefit of priority from U.S. Provisional Application No. 62/532,181, filed Jul. 13, 2017, entitled "SYSTEM AND METHOD FOR COMPARING ENTERPRISE PERFORMANCE USING INDUSTRY CONSUMER DATA IN A NETWORK OF DISTRIBUTED COMPUTER SYSTEMS," and U.S. Provisional Application No. 62/533,442, filed Jul. 17, 2017, entitled "SYSTEM AND METHOD FOR COMPARING ENTERPRISE PERFORMANCE USING INDUSTRY CONSUMER DATA IN A NETWORK OF DISTRIBUTED COMPUTER SYSTEMS," both of which are fully incorporated by reference herein.

TECHNICAL FIELD

The present disclosure relates generally to the field of performance analysis in distributed and networked computer systems. More particularly, the present disclosure relates to the use of distributed and networked computer systems in the determination and use of geography-based metrics for analyzing enterprise performance in a geographic area local to the enterprise, relative to competitors in surrounding areas.

BACKGROUND

Enterprises in competitive industries are constantly trying to assess their performance relative to their competitors (also referred to herein as "comparative performance assessments"). Such comparative performance assessments can be particularly important to auto dealerships (also referred to herein as "dealers") in the automotive (also referred to herein as "auto") industry, not the least of which is because vehicles are high-value durable products and, therefore, losing even a few sales to competitors may significantly impact an auto dealer's bottom line.

For an auto dealer, understanding how they are performing relative to their competitors can help, for instance, in setting prices competitively and in responding to marketing campaigns by their competitors. Further, knowledge gleaned from comparative performance assessments can be leveraged in improving their performance as well as formulating marketing strategies that may take advantage of some weaknesses of competitor(s) identified in the comparative performance assessments. Comparative performance assessments can also help identifying any threats posed by new entrants to a market and current competitors, and providing a realistic, quantitative measure of how successful they are at points in time.

However, particularly in the auto industry, performing a comparative performance assessment can be a complicated process due, at least in part, to the uniqueness of each dealer's geographic area, the local demand for a specific make, the specific location of competitive dealers, etc. To quantify or otherwise make an assessment of a dealer's performance in a meaningful way, all of these factors should be taken into account, but this often is not the case.

One common way to try to address this complicated dealer performance analysis problem, and what is currently implemented by automotive manufacturers, is to arbitrarily declare an Area of Influence (AOI) for each dealer and assess performance based on that AOI. However, these AOIs rarely understand the consumer demand, geographic limitations, common traffic patterns, etc. of the local area. Also, they are rarely updated. Usually, they are updated only in the event that a dealer complains that it is being treated unfairly, or when a manufacturer arbitrarily determines that it will help itself by making a change. As a result of the failure of the current systems to account for factors such as consumer demand, geographic limitations, common traffic patterns, etc. of local areas, the current systems and processes are insufficient to provide any meaningful assessment.

Conventional AOIs rarely understood the consumer demand in a particular geographic area because it is often times difficult to determine or predict the behavior of buyers. This difficulty in no small part stems from the fact that behavioral patterns of buyers vary widely with geography. These circumstances can be seen in a variety of contexts. In particular, the automotive transaction process may entail complexity of this type, as the distribution of dealers and consumers can vary widely based on geography.

However, these circumstances have not tempered the desired for effective analysis of the vehicle marketplace. Historically, the vehicle market was analyzed defining distance brackets (e.g., areas of 15, 30 and 60 miles radii) and all performance indicators for data analysis in the vehicle marketplace were calculated for those distance brackets (e.g., a close rate calculated for the area within 15 miles; a conversion rate calculated for an area within 60 miles around a zip code) for the whole nation, with no regard of the relevance of such distances to the local market. This methodology rendered rather poor predictions.

These poor predictions are not surprising at least because, as discussed, behavioral patterns vary across the nation due to factors such as population and car dealer densities, as well as connectivity (the number and types of roads). As a consequence, a journey (e.g., from a customer's home to a vehicle dealer) of 30 miles or more in rural areas is rather common, whereas such a distance is far beyond the typical journey of an urban customer. Even within the group of urban customers, the typical distance driven by a customer to reach a dealer may vary significantly by neighborhood and car brand (make). For example, the distance traveled by a consumer to find an Alfa Romeo dealership may typically be much farther than the distance travelled to find a Ford dealership, even for urban consumers. Thus, the behavioral patterns of customers, and consequently the competitive environment for dealers, vary geographically due to these factors (e.g., population, dealer densities, connectivity, etc.).

Since market key indicators (e.g., demand, conversion and close rates, market share, etc.) were conventionally based on distance of dealers or consumers without regard to the factors described above, predictions made by conventional systems and methods were subject to substantial noise arising from the variability of these factors. This noise presents a technological problem which reduces the accuracy of conventional systems in such areas as measuring and predicting the performance of dealers. For example, when it is desired to predict a close rate (the rate at which leads for a dealer become sales) based on distance, samples from rural areas will have very different close rates than samples from urban areas when considering the exact same distance, which introduces noise and is therefore detrimental to prediction accuracy. If smaller areas or segments corresponding to region types are used, this may result in small samples for some makes, which is also detrimental to prediction accuracy. Conventional methods for the determination of market indicators in the vehicle sales context thus adversely affect the ability of participants in the industry to provide accurate measurement of performance and analysis of the marketplace. This situation is particularly germane to those participants that may maintain networks of dealerships, or provide dealer or consumer facing products that rely on the accuracy of those marketplace analytics, such as TrueCar, Inc.

Skilled artisans will appreciate that in the context of vehicle data systems such as those described herein, purchasers of vehicles may be thought of as proceeding through a sales funnel provided by the vehicle data system that begins with an initial visit to a point of presence of a vehicle dealer network, such as the Truecar.com website, to search for vehicles of a particular make for sale nearby. Where the visitor searches for a vehicle and proceeds to contact a dealer, a "conversion" may be said to have occurred and the visitor may be said to have sent the dealer a "lead". A fraction of search visitors send leads, while the rest "drop out" (i.e., do not proceed any further down the sales funnel.) The fraction of search visitors that send leads may sometimes be referred to as the "conversion rate," where the "conversion rate" may be expressed more formally as shown below:

$$\text{Conversion Rate} = \frac{\text{leads}}{\text{search visitors}}$$

After submitting a lead, a search visitor may then purchase a car from a dealership. Skilled artisans will further appreciate that only a fraction of leads end with a sale, and that this fraction may be referred to as a "close rate."

$$\text{Close Rate} = \frac{\text{sales}}{\text{leads}}$$

Analyzing the effects, at the network level, of addition or subtraction of one or more dealerships to the close rate of a network of dealerships in a given spatial geographic area presents a further challenge in the context of marketplace analytics. While the addition of a dealership may increase the number of sales to the network, there may also be secondary effects to be considered, such as the extent to which the newly-added dealership may draw sales away from existing dealerships in the network.

Predicting the number of sales a dealership would be expected to make in a given geographic area presents another analytical challenge. Conventional systems for defining the extent of the relevant marketplace and areas of competition do not adequately reflect the population density, density of dealerships and other defining characteristics of the marketplace. Accordingly, current systems may be inadequate for recognizing subtler cases of under-performance in a marketplace. For example, a high-volume dealership in a busy vehicular marketplace may, in fact, despite its high sales volume, be underperforming. Similarly, a dealership in a thinner vehicular market with modest sales volumes may, in fact, be overperforming in its particular marketplace.

SUMMARY

There are therefore a number of unmet desires when it comes to obtaining, analyzing and presenting vehicle pricing data. In particular, it is desired to provide systems, methods and computer program products which are capable of generating metrics that account for density of population and density of dealerships for various makes in the context of the vehicle marketplace and thereby reduce the noise that adversely impacts conventional systems and methods.

Attention is thus directed to the systems, methods and computer program products presented here, which provide for the generation of one or more normalization metrics that account for geography and population density or spatial behavioral patterns of consumers. These normalization metrics may be a quantifier of the effect of spatial distribution of consumers or dealers, holding other factors equal. These metrics may provide a normalized way of comparing and understanding spatial behavioral patterns of car buyers and their links to competitiveness of car dealers.

These metrics may be utilized in the computation of one or more performance metrics such as close rate or the like to account for these spatial differences when performing the determination of these performance metrics. For example, the normalization metrics may be utilized to assign a dealer to a particular zone (e.g., relative to one or more other dealers).

Further, the systems presented herein may apply these metrics to the computation of other output variables of interest, such as the expected sales by a dealership in one or more zones of the relevant marketplace. For example, these metrics may be used to subdivide the relevant marketplace into zones of competitiveness, based on, amongst other factors, the proximity of dealers competing for sales of the same make of vehicle. Thus, these metrics may be used to quantify whether, for example, a dealership is performing as expected in the area in which it is the closest dealership, or, for example, whether the dealership is able to take sales from more remote and/or competitive zones.

Still further, these metrics may be utilized in the computation of sales attributable to a network of dealerships. In this way, the systems and methods presented herein may be operable to optimize the membership of the dealership by computing the sales attributable to the network of dealerships in response to addition or subtraction of a dealership. In this way, networks of dealerships, such as the TrueCar network, may be able to quantifiably identify candidate dealerships to be added or removed from the TrueCar network.

To address the Area of Influence issues discussed above, in some embodiments, the systems and methods presented herein can leverage the use of dealer competition zones (DCZ) to define a given dealer's 'backyard' zone (the area he should control) where the dealer has a geographical advantage compared to the competition. Similarly, a customer competition zone (CCZ) can be used to define a backyard zone for a group or network of dealers. Rather than choosing the area of influence based on dealer complaints or one-off arbitrary decisions, this definition uses actual consumer behavior data to declare a backyard zone for a given dealer. From that definition of a backyard zone, a dealer's total sales in their backyard can be compared against other dealers (either in aggregate or individually) to show how that dealer is doing versus their actual competition. The net result can be shown, for instance, as a number of sales for Dealer A in Dealer B's backyard vs. the number of sales for Dealer B in Dealer's A backyard. The dealer with the higher number of sales in the other's backyard is given a positive score and the lower number is assigned a negative score.

A second version of this metric is comparing Dealer A's number of sales in all other dealers' backyards combined versus all other dealers' sales in Dealer A's backyard. This metric demonstrates Dealer A's ability to protect its own territory relative to its ability to conquer others' territory. These and other aspects of the invention will be better appreciated and understood when considered in conjunction with the following description and the accompanying drawings.

One embodiment comprises a method for presenting to a user a visualization of a vehicle dealer performance assessment based on dealer location and vehicle sales transaction data. The method includes receiving in a vehicle data system embodied in a first computing device (e.g., a server), input designating one or more vehicle dealers of interest. Dealer location data and historical vehicle sales transaction data is collected from one or more external data sources that are communicatively connected to the first computing device. A subset of the collected dealer location data and historical vehicle sales transaction data is selected, including distances used in the generation of the normalization metric, and a competition zone master table is built to store the selected subset of the collected data. One or more geographical competition zones are then determined from one or more geographical regions of interest, based on the collected dealer location data and historical vehicle sales transaction data.

Determining the geographical competition zones in this embodiment comprises, for each of the geographical regions of interest, generating a normalization metric. The normalization metric is generated by first determining the difference between a first distance from a dealer of interest to a particular geographical region of interest (e.g., the center of a zip code) and a second from a competing dealer to the particular geographical region. A normalizing distance associated with a set of vehicle sales transactions in the geographical region is also determined from the collected historical vehicle sales transaction data. This may be done by examining a set of distances corresponding to the set of vehicle sales transactions in the geographical region and selecting as the normalizing distance a median value of the set of distances. Alternatively, a mean, mode, or other value representative of the set of distances may be chosen. The difference between the distances from the dealers to the geographical region is then divided by the normalizing distance to generate the normalization metric, which may be a competition zone index corresponding to the geographical region.

Based on the competition zone indices, competition zones associated with the dealers of interest may be identified in the geographical regions of interest. Each of the competition zones includes one or more of the geographical regions. In this embodiment, the competition zone index for each geographical region is a numeric value, and the competition zones associated with the dealers of interest are determined by identifying geographical regions having particular ranges of values. For example, geographical regions having competition zone indices less than or equal to 0 may be identified as a backyard zone, geographical regions having competition zone indices greater than 0 and less than or equal to 1 may be identified as a competition zone, and geographical regions having competition zone indices greater than 1 may be identified as a conquest zone. The method may include generating performance assessments for the dealers of interest based on the identified competition zones, and the performance assessments may be presented to a user via an interface on another computing device.

In one embodiment, generating the performance assessment may comprise generating a map of the geographical regions of interest, where the map visually aggregates geographical regions of interest according to the corresponding competition zone indices. For example, the map may show an aggregated backyard zone, an aggregated competition zone, and an aggregated conquest zone. In some embodiments, the method may include generating a first map of the geographical regions of interest for a first set of dealers, where the first map shows aggregated geographical regions according to the corresponding competition zone indices (e.g., a backyard zone, a competition zone, and a conquest zone). The set of dealers may then be modified by adding or subtracting a dealer, and an updated competition zone index value for each of the geographical regions of interest may be determined. Based on the updated competition zone indices, a second map can be generated, where the second map aggregates geographical regions according to the corresponding updated competition zone index values and indicates a second aggregated backyard zone, a second aggregated competition zone, and a second aggregated conquest zone. Visualizations of the first and second maps are presented to the user via an interface on a computing device, so that the user can see the changes in the competitions zones which result from the changes in the set of dealers.

Other embodiments may include systems and computer program products which embody the methods described above. Numerous other embodiments are also possible. These systems, methods, computer program products and the like are described in more detail below. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7 depicts a diagrammatic representation of a dealer performance scorecard showing conquested sales, missed sales, and net sales by a particular dealer relative to their competitions.

DETAILED DESCRIPTION

Figure 1:
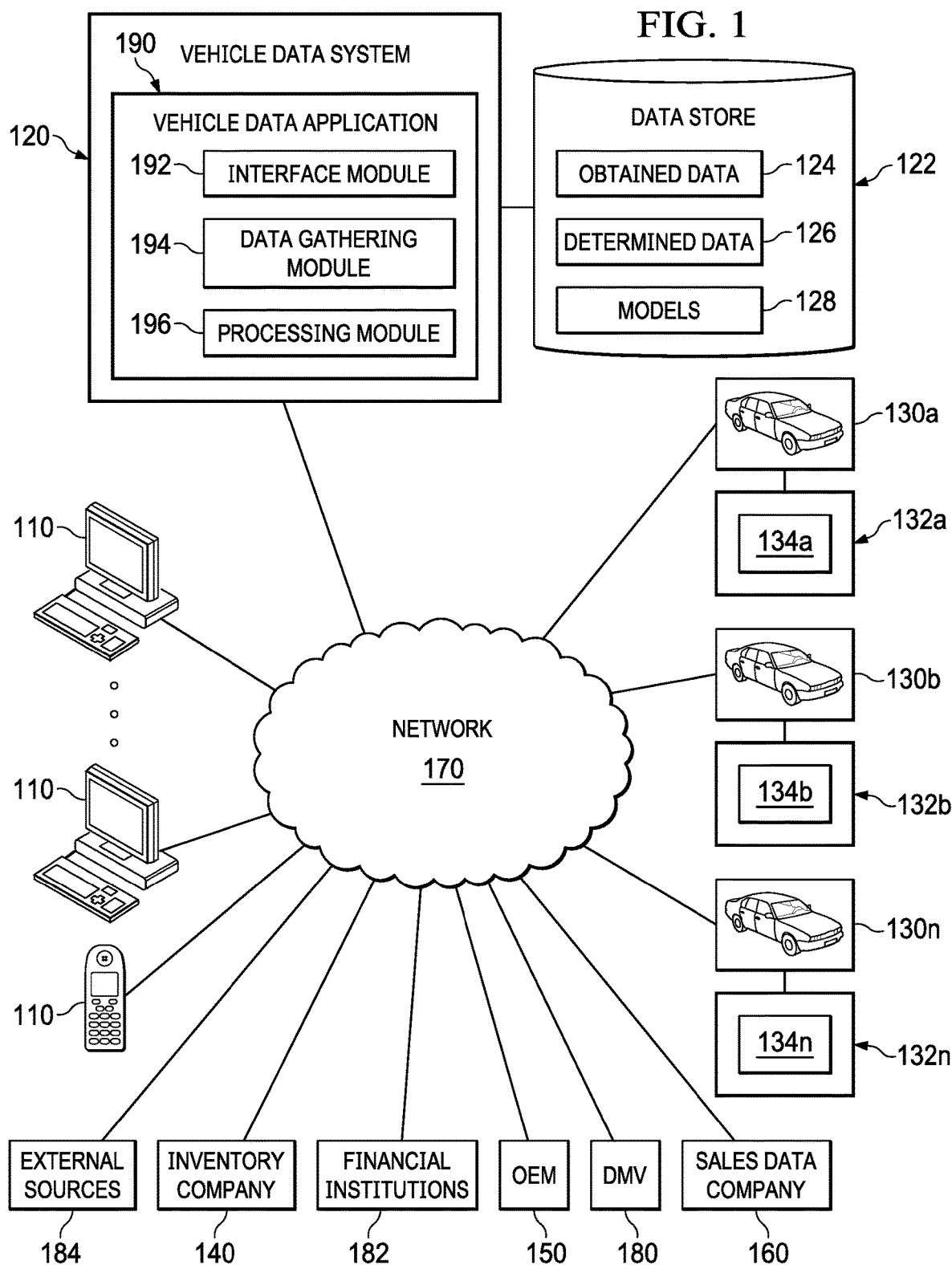
FIG. 1 is a block diagram of one embodiment of a topology including a vehicle data system.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As discussed above, there are therefore a number of unmet desires when it comes to obtaining, analyzing and presenting vehicle pricing data. In particular, it is desired to provide metrics that account for density of population and density of dealerships for various makes in the context of the vehicle marketplace.

Further, it is desired to provide, for a particular dealership in a specified marketplace with a given population density and density of dealerships of competing makes, metrics of the expected sales for the dealership. It is likewise desired to provide metrics of the expected sales for the dealership broken out, for example, across geographic zones of competitiveness.

Still further, it is desired to provide, for a particular network of dealerships across a geographic region, including geographic regions of varying population density, dealer density and other factors germane to car buying behavior, to quantify the number of sales originated by, or attributable to the dealership. It is additionally desired to be able to quantify and predict, for a given dealership, the effects on sales attributed to the network of dealerships, arising from the addition or subtraction of one or more dealerships to or from the network.

Attention is thus directed to the systems presented here, which provide, amongst other things, for the determination of one or more normalization metrics that account for geography and population density or spatial behavioral patterns of consumers. These normalization metrics may be a quantifier of the effect of spatial distribution of consumers or dealers holding other factors equal. These metrics may provide a normalized way of comparing and understanding spatial behavioral patterns of car buyers and its links to competitiveness of car dealers.

These metrics may be utilized in the computation of one or more performance metrics such as close rate or the like to account for these spatial differences when performing the determination of these performance metrics. Moreover, the normalization metrics may be utilized to assign a dealer to a particular zone (e.g., relative to one or more other dealers).

Embodiments of the systems and methods of the present invention may be better explained with reference to FIG. 1 which depicts one embodiment of a topology which may be used to implement embodiments of the systems and methods of the present invention. Topology 100 comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.,), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, computer systems 132 in car dealers 130. Network 170 may be for example, a wireless or wireline communication network such as the Internet or wide area network (WAN), publicly switched telephone network (PSTN) or any other type of electronic or non-electronic communication link such as mail, courier services or the like.

Vehicle data system 120 may comprise one or more computers or computer systems with central processing units (processors) executing instructions embodied on one or more computer readable media, where the instructions are configured to perform at least some of the functionality associated with embodiments of the present invention. These applications may include a vehicle data application 190 comprising one or more applications (instructions embodied on a computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or ensemble models, including, without limitation, one or more random forest models, or any other type of data associated with embodiments of the present invention or determined during the implementation of those embodiments.

Vehicle data system 120 may provide a wide degree of functionality including utilizing one or more interfaces 192 configured to for example, receive and respond to queries from users at computing devices 110 or dealer computer 132; interface with inventory companies 140, manufacturers 150, sales data companies 160, financial institutions 182, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or computer systems 132 at dealers 130 and store such data in data store 122. This data may be then grouped, analyzed or otherwise processed by vehicle data system 120 to determine desired data 126 or models 128 which are also stored in data store 122. A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110 or through dealer computers 132. More specifically, in one embodiment interfaces 192 may visually present the selected data set to the user in a highly intuitive and useful manner.

Turning to the various other entities in topology 100, dealer 130 may be a retail outlet for vehicles manufactured by one or more of OEMs 150. To track or otherwise manage sales, finance, parts, service, inventory and back office administration needs, dealers 130 may employ a dealer management system (DMS) 132. Since many DMS 132 are Active Server Pages(ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" (price with no negotiation) price and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes. Thus, data obtained 124 from the DMVs 180 may include vehicle registrations from dealers 130, including the dealer (or dealer location) from which a vehicle was purchased, the zip code or address of the consumer who purchased the vehicle, the date of the sales transaction, etc.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments of the present invention, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments of the present invention.

In one embodiment, the obtained data 124 or the determined data 126 may include a zip code or address for a set of vehicle dealers. These vehicle dealers may be all the dealers in a geographic area (such as nationally), or dealers 130 associated with a particular network of dealers (e.g., TrueCar dealer network) or both. Additionally, for every zip code the centroid (E.g., latitude and longitude) of the zip code may be stored. In particular, in one embodiment, this data may be stored in a lookup table such that the distance from every dealer to any other dealer may be determined or the distance from a dealer to a zip code (e.g., the centroid of a zip code) may be determined. According to some embodiments, the determined distance from a dealer's longitude and latitude to the centroid of a zip code may be referred to as the "DLR-ZIP".

Using the obtained data 124 or the determined data 126 one or more competition zone indices may be calculated. In one embodiment, a competition zone index is an indicator of competitiveness for dealers defined at zip code level and with respect to the surrounding competition. A competition zone index may take at least two formulations, namely Dealer Competition Zones (DCZ) and Customer Competition Zones (CCZ). The former may quantify how competitive a single dealer is in some specific zip code, while the latter may quantify a set of dealers with respect to another set of dealers (e.g., who may or may not be a participant in a dealer network such as the TrueCar network). For either of these two types of competition zones indices, the index may be calculated for a specific make (e.g., Ford has its own index different from Toyota) based on: 1) distances between costumers' zip codes and dealerships of a make, and 2) a set of "typical" distances driven by customers of each zip code to buy cars of that make. "Typical" is used here to refer to a distance that is representative of the distances driven by customers to buy cars in a given set of transactions. These typical distances may serve as local normalization factors. They may be defined in different ways in particular embodiments. In one embodiment, the median distance as computed from historical transactions may be used. Mean distance is also a possibility. If there are too few (or zero) records to compute mean and median, the value can be imputed as a weighted average of the closest dealers to a zip code.

According to some embodiments, the obtained data 124 may include historical data used to build the normalization factors. In some embodiments, the historical data may be obtained from an aggregator or provider of industry data, such as Polk. In such embodiments, the raw historical data may be provided in a tabular format, such as shown below, where each row represents one transaction.

| Registration Year Month | Make | Customer Zip code | Dealer Zip code | Dealer Address |
|---|---|---|---|---|
| 2016 November | Toyota | 90024 | 90401 | 120 Broadway 90024 Santa Monica CA |
| ... | ... | ... | ... | ... |

In one embodiment, a DCZ may be a non-dimensional real number determined for one or more dealers with respect to a consumer zip code. In particular, in one embodiment, a DCZ may be determined for each dealer (e.g., each dealer within a network) and each zip code. Specifically, in one embodiment, for a dealer d selling make m and a ZIP Code z, it is defined by $$DCZ(z, d, m) = \frac{distance_{z,d} - distance_{z, closest\ dealer\ to\ z\ excluding\ d}}{median\ distance\ driven\ from\ z\ to\ buy\ m} \quad (EQ1)$$

The denominator allows normalization across different geographical regions. In an urban area, the median distance will be significantly smaller than in a rural area. In zip codes with a negative DCZ, the dealer for whom the metric is being calculated is the closest; as the DCZ increases the dealer may be farther to the consumer compared to other dealers.

Figure 2:
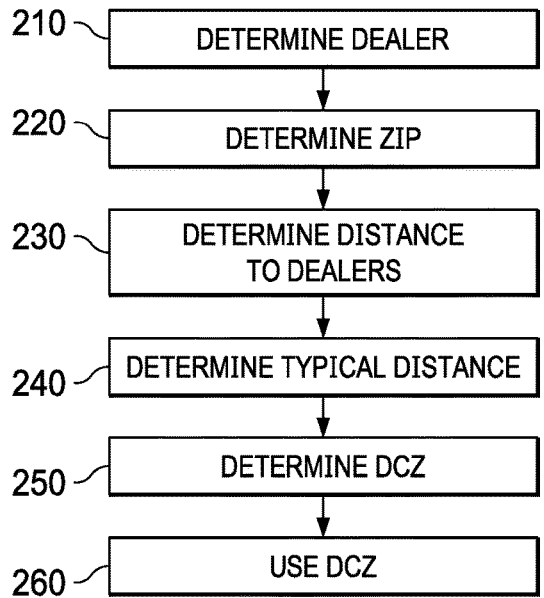
FIG. 2 is a flow diagram of one embodiment of a method for determining DCZ.
Figure 3:
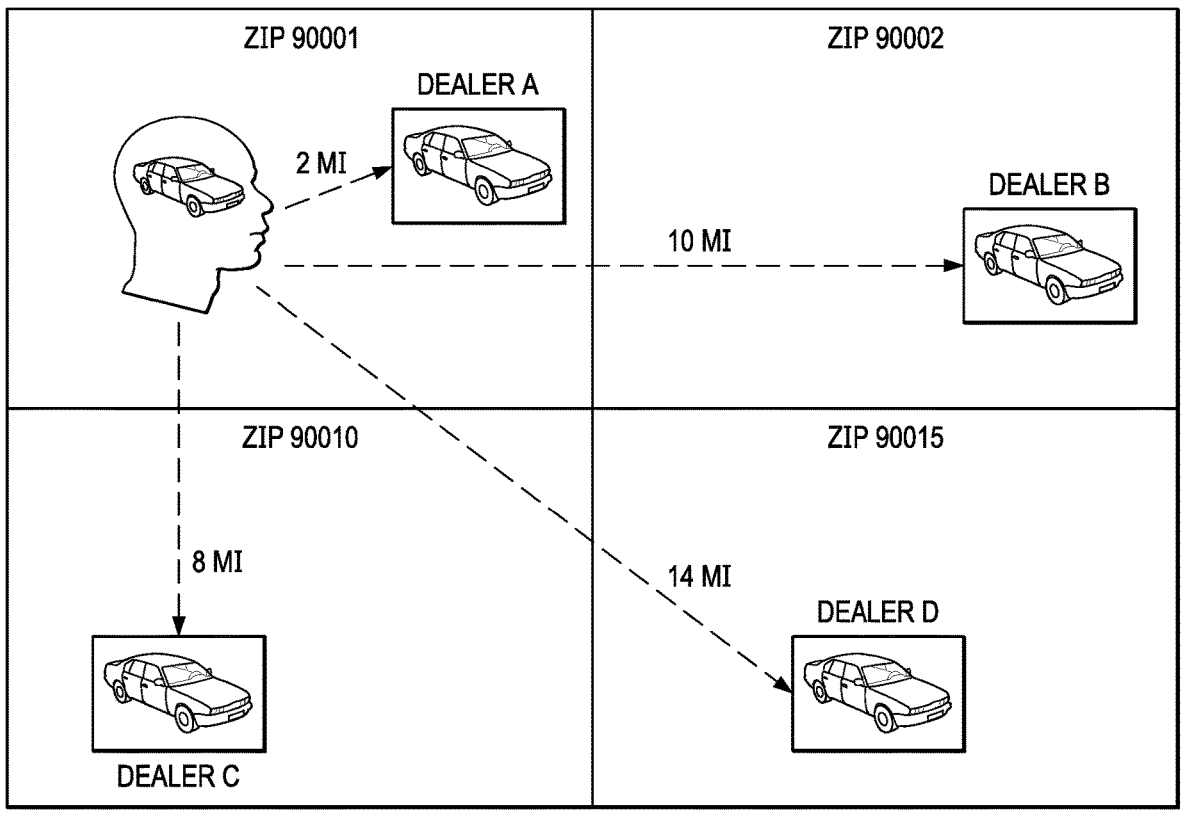
FIG. 3 is a block diagram of geographic distribution for explaining embodiments of methods of computing DCZ and CCZ.

Turning now to FIG. 2 a flow diagram for one embodiment of a method of determining a DCZ for a dealer is depicted. FIG. 3 depicts a diagram useful in illustrating an example of a DCZ calculation for a particular dealer. At step 210, a dealer of interest may be determined. This dealer may be provided through an input from an interface offered by the vehicle data system to a consumer or dealer or may be part of a regularly executed determination of DCZs for one, a number of, or all of a set of dealers (e.g., all dealers in a geographic area or within a dealer network, etc.). The dealer of interest is associated with a make of interest for which it is a dealer. If the dealer is a dealer for multiple makes, multiple DCZs for the dealer may be determined for each make which the dealer carries or a particular make of interest may be specified.

At step 220, a zip code of interest may be determined. As the purpose of a DCZ may be to determine the competition zones for a dealer, a DCZ may be determined for a dealer with respect to each zip code in a set of zip codes. In one embodiment, the set of zip codes may be all the zip codes in the country or a subset of zip codes within a certain distance of the zip code in which the dealer of interest resides.

At step 230 the distance from the zip code of interest to each of the available dealers (including the dealer of interest) for the make associated with the dealer of interest is determined. Again, the number of available dealers for which the distance is determined may be all the dealers in a geographic region (e.g., nationally, state wide, confined to some distance of the zip code of interest, etc.).

At step 240 then, the typical distance for the zip code may be determined. This typical distance may be a measure of the typical distance a consumer in the zip code of interest would travel to purchase a vehicle of the make of interest (e.g., the make associated with the dealer of interest). This typical distance may be determined from historical transaction records for consumers living in the zip code of interest as determined from records of the DMV, etc. In some embodiments, the historical transaction data used may be constrained by time such that only historical transaction data within a certain time frame (e.g., two years) may be utilized.

Using this data, a vector of distances for sales at each of the available dealers used in step 230 may be determined. Each distance in the vector is a distance traveled by a consumer in the zip code of interest to purchase a vehicle of the make of interest. As discussed, the median distance of the vector of distances may be used as the typical distance. Mean distance of the vector of distances may also be used. If there are too few (or zero) records to compute mean or median, the typical distance can be determined as a weighted average of the closest dealers to a zip code.

At step 250 then the DCZ for the dealer of interest and the zip code of interest can be determined according to EQ1 by using the distance from the zip code of interest to the dealer of interest, the distance from the zip code to the closest available dealer excluding the dealer of interest and the typical distance.

At step 260, this DCZ may be utilized to classify the zip code of interest into a zone, as will be discussed, or may be used in one or more other calculations or determinations.

Referring to FIG. 3, let's assume we want to know the DCZ value for dealer A in zip code 90001. First, all the distances from the zip code 90001 to the available dealers (i.e., dealers A, B, C, and D) for the same make for which dealer A is a dealer can be determined. For purposes of this example, assume that dealers A, B, C and D are the only dealers of the make of interest within the geographic area of interest.

Then, the typical distance can be computed. For the sake of the example assume the following historical records for customers living in 90001: 10 sales at dealer A, 5 sales at dealer B, 3 sales at dealer C and no sales at dealer D. Then the vector of distances for the historical records (in miles) is [2,2,2,2,2,2,2,2,2,2,10,10,10,10,10,8,8,8]. The median value is 2 miles and the average is 5.22 miles. In this example, the median of these distances will be chosen as typical distance.

Then, we find the closest dealer to 90001 once dealer A removed: this yields dealer C. Using EQ1:

$$DCZ(dealer\ A, 90001) = \frac{2\ mi - 8\ mi}{2\ mi} = -3.0$$

Turning now to Customer Competition Zones, CCZs may be similar to DCZ but it is defined for competing sets of dealers (sets 1 and 2) and measures the competitiveness of one set of dealers (set 1) with respect to another (set 2). These two sets of dealers may be network dealers and non-network dealers or almost any two groups or sets of dealers desired to compare. Again, CCZ may be a non-dimensional real number.

In particular, in one embodiment, a CCZ may be determined for each make and each zip code. Specifically, in one embodiment, for make m and a zip code z, CCZ is defined by $$CCZ(\text{dealer set 1, zip, } m) = \frac{\text{distance(closest dealer of set 1, zip)} - \text{distance(closest dealer of set 2, zip)}}{\text{typical distance for zip to buy } m} \quad (EQ2)$$

The denominator is the same as in the DCZ. As before, if CCZ is negative, the closest dealer to the customer is a dealer of set 1; when CCZ increases the dealers of set 1 are in a relatively weaker position compared to the dealers of set 2.

Figure 4:
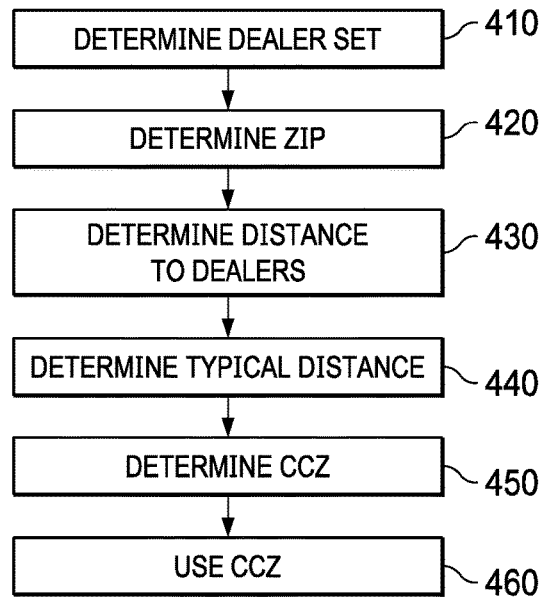
FIG. 4 is a flow diagram for one embodiment of a method for determining CCZ.

Turning now to FIG. 4 a flow diagram for one embodiment of a method of determining a CCZ for a set of dealers with respect to a make is depicted. Again, FIG. 2 depicts a diagram useful in illustrating an example of a CCZ calculation for a particular set of dealers. At step 410 dealer sets of interest may be determined. These dealer sets may include a set of dealers that belong to a network of dealers (e.g., TrueCar dealers) and a set of non-network dealers. The sets of dealers may be defined or provided through an input from an interface offered by the vehicle data system to a consumer or dealer or may be part of a regularly executed determination of CCZ for a set of dealers (e.g., all dealers in a geographic area or within a dealer network, etc.).

At step 420, a zip code of interest may be determined. As the purpose of a CCZ may be to determine how dealers within a particular set are faring with respect to dealers in another set, a CCZ may be determined for the set of dealers with respect to each zip code in a set of zip codes. In one embodiment, the set of zip codes may be all the zip codes in the country or a subset of zip codes.

At step 430 the distance from the zip code of interest to the nearest dealer (e.g., for the make of interest) in set 1 and the distance from the zip code of interest to the nearest dealer (e.g., for the make of interest) in set 2 may be determined.

At step 440 then, the typical distance for the zip code may be determined. This typical distance may be a measure of the typical distance a consumer in the zip code of interest would travel to purchase a vehicle of the make of interest (e.g., the make associated with the dealer of interest). This typical distance may be determined from historical transaction records for consumers living in the zip code of interest as determined from records of the DMV, etc. In some embodiments, the historical transaction data used may be constrained by time such that only historical transaction data within a certain time frame (e.g., two years) may be utilized.

Using this data, a vector of distances for each sale may be determined. Each distance in the vector is a distance traveled by a consumer in the zip code of interest to purchase a vehicle of the make of interest. As discussed, the median distance of the vector of distances may be used as the typical distance. Mean distance of the vector of distances may also be used. If there are too few (or zero) records to compute mean or median, the typical distance can be determined as a weighted average of the closest dealers to a zip code.

At step 450 then the CCZ for the dealers in set 1 for the make and the zip code of interest can be determined according to EQ2 by using the distance from the zip code of interest to the nearest dealer of set 1, the distance from the zip code to the nearest dealer in set 2 and the typical distance.

At step 460, this CCZ may be utilized in one or more other calculations or determinations.

Referring to FIG. 3, assume Dealers B and C belong to the TrueCar dealer network (set 1) and dealers A and D do not (set 2). As we want to know how TrueCar performs in 90001, we take the closest TrueCar dealer (dealer C) and the closest non TrueCar dealer (dealer A) and apply EQ2 above: but centered on set 1 and based on the closest elements of each set:

$$CCZ(\text{TrueCar, } 90001) = \frac{\text{distance(dealer } C, 90001) - \text{distance(dealer } A, 90001)}{\text{typical distance for } 90001} = \frac{8 \text{ mi} - 2 \text{ mi}}{2 \text{ mi}} = 3.0$$

Notice that for both DCZ and CCZ, depending on how the distances are taken, it is possible that the typical distance be zero. For example, if everything in a postal code is referenced by a single point (e.g., the zip code's centroid) it follows that customers buying in the same zip code they live will appear to have displaced 0 miles. This can be corrected by replacing 0 miles by a positive value, like 1 mile, to avoid division by zero.

The two indices as described above may facilitate comparisons of dealers across the country or may be used to normalize other calculation. In particular, both DCZ and CCZ enable more accurate performance predictions, reducing noise and accounting for local behavioral patterns. For example, a typical performance indicator is close rate, which can be modeled a function of DCZ producing curves of this type. This relationship is the basis for several prediction algorithms currently employed in the company.

The DCZ can also be used to define dealers' areas of influence (e.g., associated with certain zip codes). For example, the DCZ for a dealer may be used to define different zones of comparative advantage or disadvantage. In one embodiment, the DCZ may be used to define a 'backyard' zone where the dealer has a geographical advantage compared to the competition, a 'competition' zone where the dealer is at a comparable distance with other dealers and a 'conquest' zone where the dealer is in disadvantage in terms of distance. These zones allow dealers to better understand their market and allow better evaluation of dealer performance.

CCZ may be used to assess the strengths and weaknesses of a dealer network, allowing easier identification of areas where the dealer network has a high or low penetration. This, in turn, may allow a dealer network to more optimally expand its coverage by adding dealerships in areas with a weak coverage.

It may now be useful to discuss embodiments of systems and methods for applying the determined DCZ or CCZ values in more detail. Skilled artisans will appreciate that the following are examples of further applications and products which leverage DCZ and CCZ, and will appreciate that these indices may be used in a wide variety of calculations to account for geography or density of populations or dealerships.

Figure 5A:
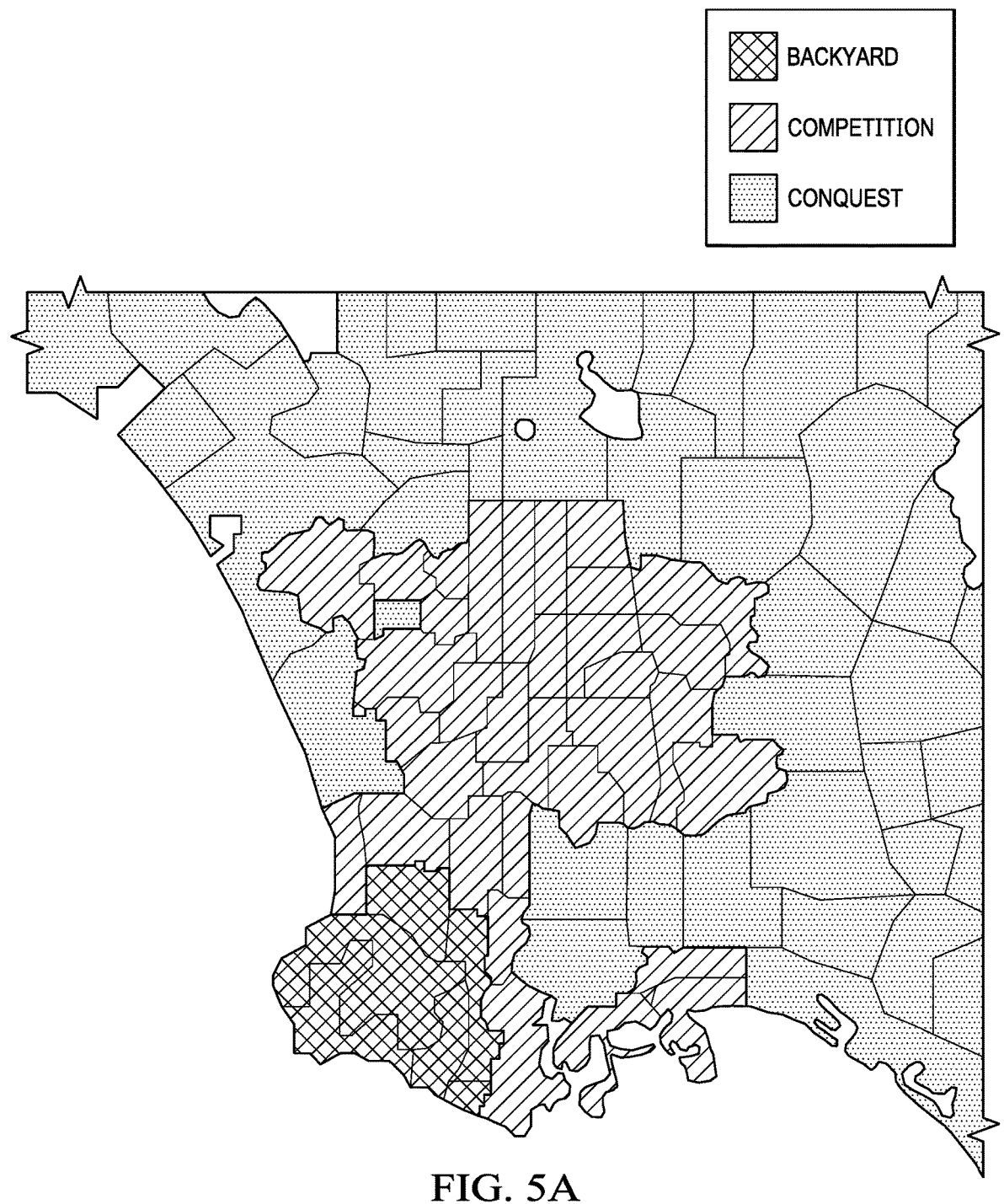
FIG. 5A is a diagram depicting competition zones.

Competition zones values can be used to create maps and aggregate the constituent regions, such as zip codes, of a geographic market into regions of similar performance for a dealer. This discretization can happen in different ways, but a small number of areas may be preferred since they better convey meaning to vehicle dealers. FIG. 5A shows an example of competition zone labels for a dealer in postal code 90505. The area is discretized into backyard, competition and conquest regions.

Figure 5B:
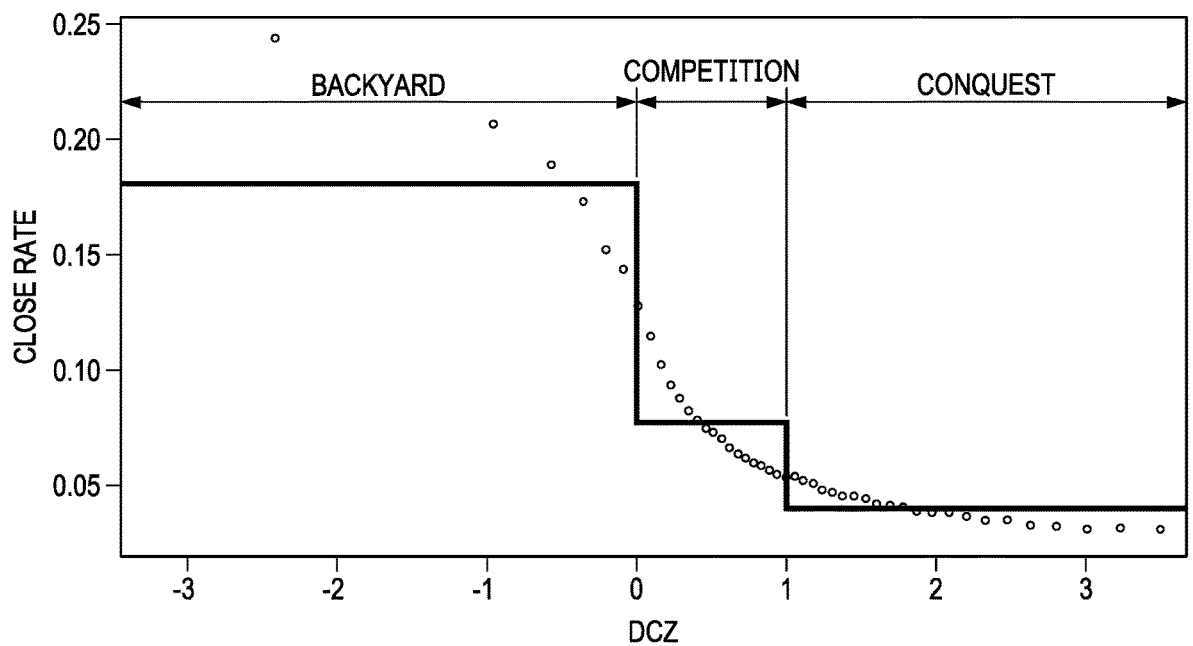
FIG. 5B is a diagram depicting an example of close rate as a function of DCZ.

The definition of these zones is tied to the DCZ-Close Rate relationship (as seen in FIGS. 5A and 5B) and depends on a set of cutoffs that define what label to assign based on DCZ values. A similar exercise is possible for CCZ values. The implementation of such labeling will be described in more detail at a later point herein.

In one embodiment, the Dealer Centric Competition Zone Index (DCZ) provides a numerical value for each of the dealer-zip code pairs in the country. This index is then transformed into a categorical label ('backyard', 'competition', 'conquest') that defines dealers' areas of influence. From a high level standpoint, the dealer's areas of influence can be interpreted in the following way (see FIG. 5B): the 'backyard' zone corresponds to the zip codes where the dealer has a geographical advantage compared to the competition; the 'competition' zone corresponds to the zip codes where the dealer is at a comparable distance with other dealers; and the 'conquest' zone corresponds to the zip codes where the dealer is in disadvantage in terms of distance. Depending on the characteristics of the relevant market and the density of competing dealers within a radius that customers may foreseeably drive to purchase a car, a greater or fewer number of 'competition' zones may be appropriate. For example, large conurbations well-served by an abundance of freeways, such as the Los Angeles-Orange County area or the Dallas-Fort Worth metroplex, further gradations of zone levels, such as "close conquest" and "near conquest" may prove helpful in fully modeling a dealer or network of dealers' standing in the market.

A two-step process may be used to convert the DCZ Index into these areas of influence. At step one a first set of temporary labels are defined for each dealer-zip code pair using the following logic:

| Index Range | Temporary Label |
| --- | --- |
| DCZ ≤ 0 | Backyard |
| 0 < DCZ ≤ 1 | Competition |
| 1 < DCZ | Conquest |

This table corresponds to the depiction of competition zones in FIGS. 5A and 5B. These definitions translate into index ranges the intuition described above: the backyard zone corresponds to the area where the dealer is the closest dealer to the customer; the competition zone is the area where the dealer's distance to the customer is similar to the closest dealer's distance; and the conquest zone is the area where the dealer is farther from the customer compared to the competition.

At step two, one or more rules may be accounted for while defining competition zones labels. As but one example, a rule may dictate that if a zip code is labeled as a backyard for one dealer it must be a conquest for all other competing dealer (e.g., of the same make). This rule translates the fact that the backyard zone should be the area where the dealer is in very clear advantage compared to the competition. In this area, he is not "competing" with other dealers.

In particular, after the temporary labeling defined in step one, it is possible that a zip code is labeled as backyard for one dealer and competition for at least another dealer. We will talk about "conflict zip codes" in this case. In one embodiment, a second relabeling step is defined to take into account the business rule and solve the conflicts.

Consider a conflict zip code. Let's assume that dealer B has a DCZ value of $d_B \leq 0$ and that it is thus labeled as "backyard", and that dealer C has a DCZ value of $d_C \in [0,1]$ and it is labeled as competition. There are two possible ways of solving the problem: 1) if dealer B has a significantly stronger influence than dealer C in the zip code, then the zip code label for dealer B should stay "backyard", and dealer C's label should be switched to "conquest" for the zip code, and 2) if dealer B and C seem to have a similar influence in the zip code, then both dealers should be considered as "competition" for the zip code.

To measure dealers' "influence" in a conflict zip code, two metrics may be analyzed in one embodiment: dealer market share and DCZ index value. The dealer market share at a zip code level is defined as:

$$Market_{Share(dealer,zip)} = \frac{\text{Number of vehicles sold by dealer to a customer in zip}}{\text{Number of vehicles bought by customers in zip}} \quad (EQ3)$$

Intuitively, a dealer with high market share is very influential in the zip code.

To re-label a zip code then, the vehicle data system may employ a relabeling algorithm that first looks at market share (when there are enough transactions in the zip codes for it to be meaningful). In one embodiment, this algorithm may specify that if dealer B has a significantly higher market share than dealer C then dealer C is relabeled as conquest. Otherwise dealer B is relabeled as competition.

In cases where there may not be sufficient transactions to compute a meaningful market share, the relabeling may be based on DCZ Index. The approach is similar: if dealer B has a very low DCZ value (which should indicate that it is significantly closer to the consumer) then dealer C is relabeled as conquest. Otherwise dealer B is relabeled as competition.

In one particular embodiment, the method for relabeling may be expressed as follows:

```
relabeling for zip, make considered as backyard for one dealer and
competition for at least one other dealer (using temp_label)
variables:
total_sales: total sales for make m in zip code z
back_ms: market share for dealer considered as backyard in zip code z
and make m
comp_ms: maximum (market share of dealers considered as competition
for zip code z and make m)
dcz_back: dcz index of dealer considered as backyard
min_dcz_comp: min dcz of dealers considered as competition
parameters:
thres0=0
thresh1=1
MS_thresh1=40%
MS_thresh2=1.2
min_sales=50
def winner(back_ms,comp_ms,total_sales,dcz_back,min_dcz_comp):
    if total_sales>=min_sales:
        if back_ms>=MS_thresh1:
            return "Back"
        elif back_ms>=MS_thresh2*comp_ms:
```

```
            return "Back"
        else:
            return "Competition"
    else:
        if (thresh1-dcz_back)>=(thresh2-min_dcz_comp):
            return "Back"
        else:
            return "Competition"
```

The previous function decides who is the 'winner' of the conflict.

```
if winner='Backyard' then the competition zips get relabeled as 'conquest'
if winner='Competition' then the backyard zip gets relabeled as
'competition'
        if (thresh1-dcz_back)>=(thresh2-min_dcz_comp):
            return "Back"
        else:
            return "Competition"
```

The previous function decides who is the 'winner' of the conflict.
if winner='Backyard' then the competition zips get relabeled as 'conquest'
if winner='Competition' then the backyard zip gets relabeled as 'competition'

As discussed above, one common way to solve a complicated dealer performance analysis problem, and what is currently implemented by automotive manufacturers, is to arbitrarily declare an Area of Influence (AOI) for each dealer and assess performance based on that AOI. However, these AOIs rarely understood the consumer demand, geographic limitations, common traffic patterns, etc. of each dealer's local area.

For example, in the standard manufacturing version of a "Pump In/Pump Out" report, every location in the country is assigned to someone's Area of Influence (alternatively called Primary Marketing Area or PMA). This means that every car sale will either fall into a dealer's own PMA/AOI or someone else's. Thus, Pump In Sales (ones from someone else's PMA) are simply all sales from that dealer's PMA. Similarly, Pump Out Sales are all sales from the dealer's own PMA that go to a different dealer. Consequently, such a "Pump In/Pump Out" report provides a dealer with quite a simplified, binary view that the total number of sales in any given dealer area is simply the number of sales made by the dealer and the number of sales made by other dealers. This does not reflect the actual, more complicated world or provide any insight as to how and/or where a dealer's performance may be improved.

Further, unless a dealer complains that they are treated unfairly, the AOIs are rarely updated. In some areas where there is an increasing need for dealers (e.g., due to population growth, income growth, etc.), this means that the AOIs may not actually reflect each dealer's service area or territory. For example, Dealer A may have been the only dealer in town when Dealer A's AOI (which covers the entire town) was first determined. However, the town's population has since grown significantly and new roads constructed since then have made it easier for town residents to travel to the next town over to buy cars from some other dealers. As a result, Dealer A's effective AOI of the vehicles that Dealer A is carrying and selling do not track and/or automatically update their AOIs to reflect current market and/or changes that may affect the AOIs, the same AOI is used to produce a "Pump In/Pump Out" report unless either Dealer A demands a change to their AOI or the manufacturer happens to recognize the need for a change. Unfortunately for Dealer A, this AOI/PMA also determines where they are allowed to market, so by requesting a change to their AOI, he is limiting his own marketing opportunities. Thus, there is little incentive to request a reduction in AOI size.

These and other issues with the AOI's arbitrary "definition" (which is often driven by business decisions) indicate an unmet need for an insightful and meaningful dealer performance assessment. To address the aforementioned issues, in some embodiments, the systems and methods presented herein take a data-driven approach by leveraging the dealer competition zones (DCZ) described herein. As discussed above with reference to FIGS. 5A and 5B, the DCZ can be used to quantitatively define a particular dealer's areas of influence and different zones of comparative advantage or disadvantage, including the particular dealer's 'backyard' zone where they have a geographical advantage compared to their competition, a 'competition' zone where the particular dealer is at a comparable distance with other dealers, and a 'conquest' zone where the particular dealer is in disadvantage in terms of distance.

These zones allow dealers to better understand their respective market and allow better evaluation of dealer performance. That is, rather than basing an AOI on dealer complaints and/or one-off arbitrary decisions, this DCZ-based definition can be driven by actual consumer behavior data based on which a backyard zone for a given dealer is declared. From that definition of a backyard zone, a dealer's total sales in their backyard can be compared against other dealers (either in aggregate or individually) to show how that dealer is doing versus their actual competition.

Again, the definition of these zones is tied to the DCZ-Close Rate relationship (as seen in FIGS. 5A and 5B) and depends on a set of cutoffs (predetermined values) that define what label to assign to a constituent region (e.g., a zip code) of a geographic market.

That is, unlike the conventional AOI definition, in some embodiments, a dealer can have a plurality of areas of influence categorized into 'backyard', 'competitive', and 'conquest'. Each dealer-consumer zip code pair in a geographic market (e.g., a country) is labeled as 'backyard', 'comp', or 'conquest'. 'Backyard' zip codes are the ones where the dealer in question is the closest dealer and dominates the local Market Share. 'Comp' zip codes are the ones where the dealer in question and at least one other dealer are equidistant and equally likely to get a sale. 'Conquest' zip codes are the ones where the dealer in question is far away and has a low chance of sale.

Figure 6:
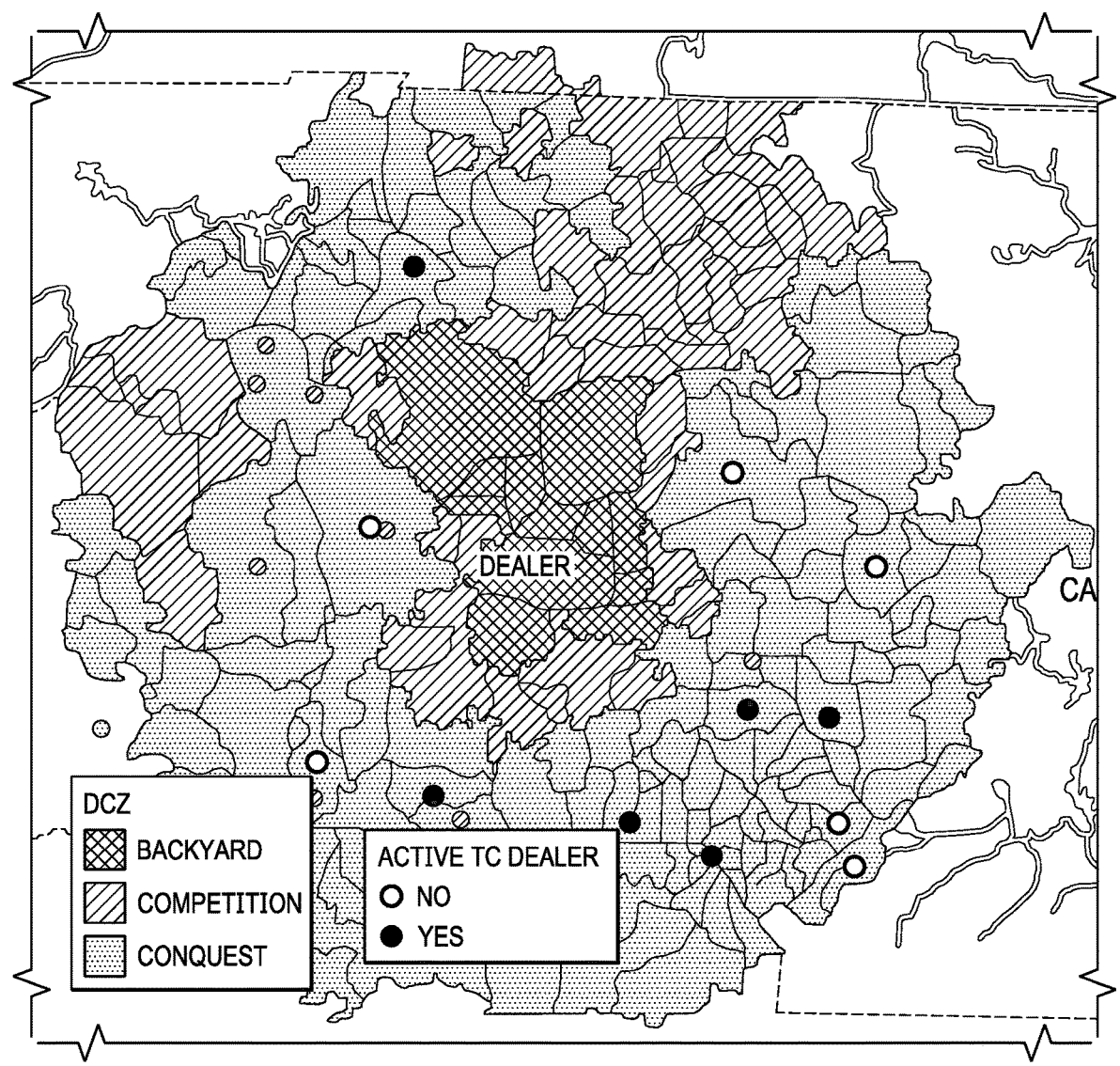
FIG. 6 depicts an example of a competition zone map showing zip codes that are determined and labeled as a particular dealer's areas of influence.

FIG. 6 depicts an example of a competition zone map showing zip codes that are determined to be (and labeled as) the 'backyard' area, the competitive or 'comp' area, and the 'conquest' area of a particular dealer. As illustrated in FIG. 6, zip codes that are categorized into the same area need not be physically adjacent to one another. In the example of FIG. 6, the 'comp' area can include discrete groups of zip codes. Further, competition zone maps can be distinct from one another, as they are particular to a given dealer.

To give meaning to the sales made by a dealer and to give insight into the dealer's comparative performance relative to their competition, in some embodiments, historical transaction data can be filtered to determine "Conquest Sales" and "Missed Sales." This filtering is possible at least because, as discussed above, historical transactions collected by the underlying system (e.g., vehicle data system 120 of FIG. 1) from disparate sources include records of consumers living in the zip code of interest (e.g., as determined from records of the DMV, etc.) and, using this data, the system can determine how far a consumer in the zip code of interest travels to purchase a vehicle of the make of interest from which dealer. Correlating the zip code of interest (in this case, the consumer's zip code) with the dealer's DCZ, the system can determine if the consumer who purchased the vehicle is from the dealer's 'backyard' or someone else's 'backyard'.

In this disclosure, the "Conquest Sales" metric refers to the number of sales that Dealer A gets from another dealer's 'backyard'. The "Missed Sales" metric refers to the number of sales that another dealer gets from Dealer A's 'backyard'. The sales from the 'comp' zip codes ("Competitive Sales") are not used in this calculation.

FIG. 7 depicts a diagram (also referred to herein as a "Dealer Performance Scorecard") showing "Conquest Sales" by Dealer A relative to their competitions (e.g., Dealers 701 . . . 719) as positive values and "Missed Sales" by Dealer A relative to their competitions as negative values. In this example, with respect to a particular make (e.g., "Honda"), Dealer A has the largest number of "Conquest Sales" (285) from Dealer 713 but also lost the largest number of "Missed Sales" to Dealer 713. In one embodiment, the system can further determine a "Net Sales" per each deal-competition pair (where "Net Sales"="Conquest Sales"−"Missed Sales") and compare the "Net Sales" relative to the "Conquest Sales" and "Missed Sales," as exemplified in the Dealer Performance Scorecard shown in FIG. 7.

By removing "Competitive Sales" and focusing only on those where there should be a clear winner, embodiments of a DCZ-based, data-driven solution can provide a much more accurate and useful comparative performance assessment of "Conquested" sales by a given dealer in their own 'backyard'. Furthermore, by performing the filtering in this way, every customer will belong to a specific dealer's 'backyard'. This means one dealer would be the clear favorite to win (close) the sale. Thus, all "Conquested" sales are truly conquested—they went to a dealer that was not expected to close (win) the sale. Likewise, "Missed" sales can account for all the sales that a dealer was expected to, but did not, win in their 'backyard'. This is in contrast with the common "Pump In/Pump Out" report described above that does not differentiate between sales from competitive areas and those from backyard areas. The ability to recognize and differentiate "Conquest Sales" from "Missed Sales" is critical because the resulting comparison is meaningful and can lead to actionable insights.

In some embodiments, the "Competitive Sales" that were filtered out of the above-described DCZ-based, data-driven comparative performance assessment solution can also be aggregated and compared against rival dealers to provide a secondary "Competitive Scorecard" (as opposed to a dealer-centric scorecard such as the "Dealer Performance Scorecard" shown in FIG. 7). This "Competitive Scorecard" shows a dealer's performance against another (or multiple) dealer(s) only in situations where each dealer has about an even chance at the sale. As described above, in 'comp' zip codes, the dealer in question and at least one other dealer are equidistant and equally likely to get a sale. By isolating data in 'comp' zip codes and performing a comparative performance assessment relative to the number of sales made by each dealer in the 'comp' zip codes, this comparison can be incredibly useful to dealers to see how they are performing when customers in 'comp' zip codes have multiple realistic options and end up choosing one dealer over another.

Figure 8:
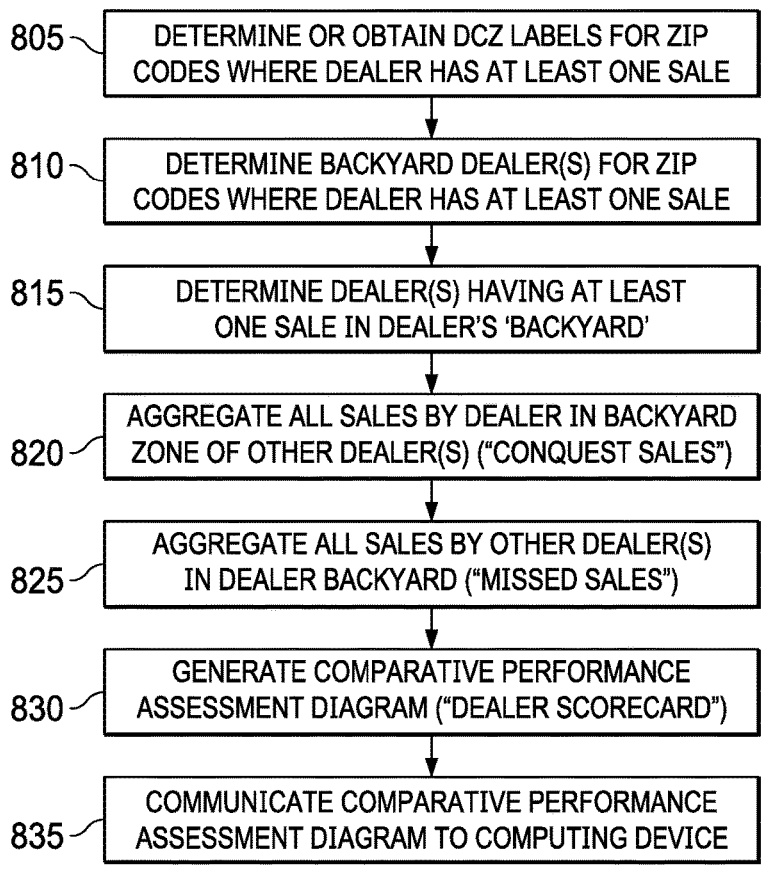
FIG. 8 is a flow diagram for one embodiment of a method for comparatively assessing performance of a dealer in the auto industry.

In some aspects, filtering out data from 'comp' zip codes and/or isolating data in 'comp' zip codes can be part of a data preparation step of a comparative performance assessment method that utilize data generated from the method of determining a DCZ for a dealer described above with reference to FIG. 2. A non-limiting example of comparative performance assessment method 800 is depicted in FIG. 8. In one embodiment, method 800 may be performed by vehicle data system 120 of FIG. 1 described above.

In the example of FIG. 8, method 800 may include classifying, utilizing the DCZ thus determined (see FIG. 2), all zip codes associated with a dealer of interest into 'backyard', 'comp', and 'conquest' areas of influence for the dealer of interest (805). "Associated" in this case means that the dealer of interest has at least one industry sale.

As a result of this classifying step, each zip code associated with the dealer of interest is labeled (e.g., in a database table associated with the dealer of interest) with 'backyard', 'comp', or 'conquest' accordingly. If the zip codes had already been labeled using a previously determined DCZ, they can be retrieved or otherwise obtained (e.g., from the database table associated with the dealer of interest) for use in the next step.

In this example, the dealer of interest is a dealer in the auto industry. However, skilled artisans can appreciate that the dealer can represent a non-limiting example of an enterprise in any particular industry.

As discussed above, the "Conquest Sales" metric refers to the number of sales that a dealer of interest (e.g., Dealer A) gets from another dealer's 'backyard', while the "Missed Sales" metric refers to the number of sales that another dealer gets from Dealer A's 'backyard'. This means that, for each particular zip code where Dealer A has an industry sale, the system is operable to determine, on the one hand, whether that particular zip code is actually some other dealer's 'backyard' (810), and, on the other hand, what dealer(s) have actually made a sale in Dealer A's 'backyard' (815). Notice the sales from the 'comp' zip codes ("Competitive Sales") are not used or considered by the system. This has a technical effect of filtering out sales from zip codes labeled as 'comp'.

To generate a dealer performance scorecard for Dealer A, the system may operate to aggregate all sales for Dealer A from zip codes labeled as 'backyard' of the dealers from step 810 ("Conquest Sales") as well as Dealer A itself ("Backyard Sales") (820). In one embodiment, if a specific scorecard is desired (e.g., if Dealer A is competing with Dealer B), the system may operate to calculate a total sales for Dealer A in Dealer B's backyard. For "Missed Sales," the system may operate to determine how many sales other dealer(s) made in Dealer A's backyard (825). Based on the aggregated number of "Conquest Sales" (e.g., Dealer A's sales in Dealer B's backyard) and the aggregated number of "Missed Sales" (e.g., Dealer B's sales in Dealer A's backyard), the system can then generate a comparative performance assessment diagram (e.g., "Dealer Performance Scorecard" shown in FIG. 7) (830) and communicate same over a network (e.g., network 170 of FIG. 1) for display on a computing device (e.g., computing device 110 of FIG. 1) (835).

As described above, the diagram thus generated may include a net comparison between the dealer of interest (e.g., Dealer A) and a competing dealer (e.g., Dealer B). As an example, a comparative performance assessment diagram may show the "Net Sales" between "Conquest Sales" made by Dealer A in Dealer B's 'backyard' and "Missed Sales" made by Dealer B in Dealer A's 'backyard'.

As also described above, data used by the system may be constrained by time such that only historical transaction data within a certain time frame (e.g., a month) may be utilized. In this case, the system may operate to determine an overall performance for a dealer of interest in a particular time period by summing all "Conquest Sales" vs. all "Missed Sales" by the dealer of interest in that particular time period and present the results accordingly in a comparative performance assessment diagram, with or with a net comparison between the dealer of interest and their competition(s).

One main advantage of the invention is that a given dealer can immediately understand multiple metrics: 1) how many sales are they losing from their backyard (based on a meaningful definition) to competitors, 2) which dealers are actually their biggest threats in their area, 3) what conquest areas (rivals' backyards) are they having the most success. Going a little deeper, they can see how changes in their business practices have helped them over time by looking at month over month comparisons. For example, if they improved their call center process to attract more customers from farther distances, then they should see the number of conquest sales increase over time and potentially just in specific dealer's backyards.

Embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer instructions executable (which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for presenting to an interface via a distributed and networked system a visualization of a vehicle dealer performance assessment based on dealer location and vehicle sales transaction data, the method comprising:
  receiving, by a vehicle data system embodied in a first computing device, input designating one or more vehicle dealers of interest;
  collecting dealer location data from one or more external data sources that are connected via the distributed and networked system to the first computing device;
  collecting historical vehicle sales transaction data from the one or more external data sources using one or more interfaces for each respective one of the external data sources via the distributed and networked system;
  selecting a subset of the collected dealer location data and historical vehicle sales transaction data including distances used in generating a normalization metric and building a competition zone master table which stores the selected subset of the collected dealer location data and historical vehicle sales transaction data;
  determining one or more geographical competition zones among one or more geographical regions of interest based on the collected dealer location data and historical vehicle sales transaction data;
  wherein determining the one or more geographical competition zones comprises:
    for each of the geographical regions of interest, generating a normalization metric by:
      determining from the collected dealer location data a difference value representing a difference between: a first distance between one or more dealers of interest and a geographical region of interest; and a second distance between one or more competing dealers and the geographical region of interest, determining from the collected historical vehicle sales transaction data a normalizing distance associated with a set of vehicle sales transactions in the geographical region of interest, wherein determining the normalizing distance comprises examining a set of distances corresponding to the set of vehicle sales transactions in the geographical region of interest and selecting as the normalizing distance a median value of the set of distances corresponding to the set of vehicle sales transactions in the geographical region of interest, and dividing the determined difference value by the normalizing distance to generate the normalization metric, wherein the normalization metric comprises a numeric competition zone index corresponding to the geographical region of interest, identifying competition zones associated with the one or more dealers of interest based on competition zone indices corresponding to each of the geographical regions of interest, wherein each of the competition zones includes one or more of the geographical regions of interest, wherein the competition zone index corresponding to each geographical region of interest comprises a numeric value, wherein identifying the competition zones associated with the one or more dealers of interest comprises identifying geographical regions of interest having competition zone indices less than or equal to 0 as a backyard zone, identifying geographical regions of interest having competition zone indices greater than 0 and less than or equal to 1 as a competition zone, and identifying geographical regions of interest having competition zone indices greater than 1 as a conquest zone; and generating, in real-time, a performance assessment for the one or more dealers of interest based on the identified competition zones and presenting the performance assessment via an interface on a second computing device, wherein generating the performance assessment comprises determining a first number of sales made by the one or more dealers of interest in the conquest zone, determining a second number of sales made by dealers other than the one or more dealers of interest in the backyard zone, determining a number of net sales by the one or more dealers of interest, wherein the net sales is equal to the first number of sales minus the second number of sales, and generating a performance scorecard display including a graphical visualization of at least the number of net sales by the one or more dealers of interest.

2. A vehicle data system for determining performance of dealers using normalization metrics in real-time, comprising:

a first computing device having a processor and a computer readable storage medium;

a second computing device coupled via a distributed and networked system to the first computing device, wherein the second computing device runs a first interface that enables interaction with the second computing device and the first computing device; and one or more interfaces respectively associated with one or more external data sources coupled via the distributed and networked system to the first computing device, wherein the one or more external data sources store dealer location data and historical vehicle sales transaction data;

wherein the computer readable storage medium of the first computing device stores one or more instructions executable by the processor to perform:

receiving input designating one or more vehicle dealers of interest, collecting dealer location data from the one or more external data sources, collecting historical vehicle sales transaction data from the one or more external data sources, determining one or more geographical competition zones among one or more geographical regions of interest based on the collected dealer location data and historical vehicle sales transaction data, wherein determining the one or more geographical competition zones comprises:

for each of the geographical regions of interest, generating a normalization metric by:

determining from the collected dealer location data a difference value representing a difference between: a first distance between one or more dealers of interest and a geographical region of interest; and a second distance between one or more competing dealers and the geographical region of interest, determining from the collected historical vehicle sales transaction data a normalizing distance associated with a set of vehicle sales transactions in the geographical region of interest wherein determining the normalizing distance comprises evaluating, for the set of vehicle sales transactions in the geographical region of interest, a typical distance traveled by customers to purchase vehicles, and dividing the determined difference value by the normalizing distance to generate the normalization metric, wherein the normalization metric comprises a competition zone index corresponding to the geographical region of interest, identifying competition zones associated with the one or more dealers of interest based on competition zone indices corresponding to each of the geographical regions of interest, wherein each of the competition zones includes one or more of the geographical regions of interest; and generating a performance assessment for the one or more dealers of interest based on the identified competition zones and presenting the performance assessment to a user via the first interface on the second computing device.

3. The vehicle data system of claim 2, wherein the competition zone index corresponding to each geographical region of interest comprises a numeric value, wherein identifying the competition zones associated with the one or more dealers of interest comprises identifying geographical regions of interest having competition zone indices less than or equal to a first threshold as a backyard zone, and identifying geographical regions of interest having competition zone indices greater than the second threshold as a conquest zone, wherein generating the performance assessment comprises determining a first number of sales made by the one or more dealers of interest in the conquest zone, determining a second number of sales made by dealers other than the one or more dealers of interest in the backyard zone, determining a number of net sales by the one or more dealers of interest, wherein the net sales is equal to the first number of sales minus the second number of sales, and generating a performance scorecard display including a visualization of at least the number of net sales by the one or more dealers of interest.

4. The vehicle data system of claim 2, wherein the competition zone index corresponding to each geographical region of interest comprises a numeric value, wherein the one or more dealers of interest comprises a plurality of dealers of interest, wherein, for each of the plurality of dealers of interest, and wherein generating the performance assessment comprises, for one or more of the geographical regions of interest:

identifying a first set dealers of interest that have made sales in the one or more of the geographical regions of interest;

identifying a number of sales made in the one or more of the geographical regions of interest by each of the first set of dealers of interest; and generating a competitive scorecard display including a visualization of the number of sales made in the one or more of the geographical regions of interest by corresponding ones of the first set of dealers of interest.

5. The vehicle data system of claim 2, wherein the competition zone index corresponding to each geographical region of interest comprises a numeric value, wherein the one or more dealers of interest comprise a plurality of dealers of interest, and wherein generating the performance assessment comprises:

for each of the plurality of dealers of interest, identifying geographical regions of interest having competition zone indices less than or equal to a first threshold as a backyard zone corresponding to the dealer of interest, identifying geographical regions of interest having competition zone indices greater than the second threshold as a conquest zone corresponding to the dealer of interest, determining a first number of sales made by the dealer of interest in the conquest zone corresponding to the dealer of interest, determining a second number of sales made by dealers other than the dealer of interest in the backyard zone corresponding to the dealer of interest, determining a number of net sales by the dealer of interest, wherein the net sales is equal to the first number of sales minus the second number of sales; and generating a performance scorecard display including a visualization of at least the number of net sales by each of the plurality of dealers of interest, wherein the visualization for each of the plurality of dealers of interest is positioned adjacent to one or more visualizations for others of the plurality of dealers of interest, thereby providing a comparative visualization of performance of the plurality of dealers of interest.

6. The vehicle data system of claim 2, wherein generating the performance assessment comprises generating a map of the geographical regions of interest, wherein the map aggregates geographical regions of interest according to the corresponding competition zone indices and indicates an aggregated backyard zone, an aggregated competition zone, and an aggregated conquest zone.

7. The vehicle data system of claim 2, further comprising determining, for each of the geographical regions of interest, a corresponding close rate; and, for the one or more dealers of interest, storing the competition zone index and the close rate corresponding to each of the geographical regions of interest in a close rate data structure.

8. The vehicle data system of claim 2, wherein the normalizing distance comprises a median value of a set of distances corresponding to the set of vehicle sales transactions in the geographical region of interest.

9. The vehicle data system of claim 2, further comprising, after collecting the dealer location data and the historical vehicle sales transaction data from the one or more external data sources, selecting a subset of the collected dealer location data and historical vehicle sales transaction data including distances used in the generation of the normalization metric and building a competition zone master table which stores the selected subset of the collected dealer location data and historical vehicle sales transaction data.

10. The vehicle data system of claim 2, wherein the normalization metric comprises a dealer competition zone (DCZ) metric for a specific dealer of interest and a specific make of vehicle in which, for each of the geographical regions of interest, a corresponding DCZ value is generated by:

determining from the collected dealer location data a difference value representing a difference between: a first distance between the specific dealers of interest and a geographical region of interest; and a second distance between a next-closest competing dealer and the geographical region of interest;

determining from the collected historical vehicle sales transaction data the normalizing distance associated with a set of vehicle sales transactions corresponding to the specific make of vehicle in the geographical region of interest; and dividing the determined difference value by the normalizing distance to generate the DCZ value corresponding to the geographical region of interest.

11. The vehicle data system of claim 2, wherein the normalization metric comprises a customer competition zone (CCZ) metric for a first set of dealers with respect to a competing set of dealers and with respect to a specific make of vehicle in which, for each of the geographical regions of interest, a corresponding CCZ value is generated by:

determining from the collected dealer location data a difference value representing a difference between: a first distance between a closest one the first set of dealers of interest and the geographical region of interest; and a second distance between a closest one of the competing set of dealers and the geographical region of interest;

determining from the collected historical vehicle sales transaction data the normalizing distance associated with a set of vehicle sales transactions corresponding to the specific make of vehicle in the geographical region of interest; and dividing the determined difference value by the normalizing distance to generate the DCZ value corresponding to the geographical region of interest.

12. The vehicle data system of claim 11, wherein generating the performance assessment for the one or more dealers of interest based on the identified competition zones comprises:
- generating a first map of the geographical regions of interest corresponding to the first set of dealers, wherein the first map aggregates geographical regions of interest according to the corresponding DCZ values and indicates a first aggregated backyard zone, a first aggregated competition zone, and a first aggregated conquest zone;
- generating an updated first set of dealers by adding at least one dealer to the first set of dealers or subtracting at least one dealer from the first set of dealers;
- generating an updated CCZ value for each of the geographical regions of interest;
- generating a second map of the geographical regions of interest corresponding to the updated first set of dealers, wherein the second map aggregates geographical regions of interest according to the corresponding updated DCZ values and indicates a second aggregated backyard zone, a second aggregated competition zone, and a second aggregated conquest zone; and
- presenting visualizations of the first map and the second map via an interface on a computing device.

13. A computer program product comprising at least one non-transitory computer readable medium storing instructions translatable by a computing device embodying a vehicle data system to perform:
- receiving, by the vehicle data system, input designating one or more vehicle dealers of interest;
- collecting, by the vehicle data system via a distributed and networked system, dealer location data from one or more external data sources;
- collecting, by the vehicle data system, historical vehicle sales transaction data from the one or more external data sources using one or more interfaces for each respective one of the external data sources via the distributed and networked system; and
- determining, by the vehicle data system, one or more geographical competition zones among one or more geographical regions of interest based on the collected dealer location data and historical vehicle sales transaction data,
- wherein determining the one or more geographical competition zones comprises:
- for each of the geographical regions of interest, generating a normalization metric by:
  - determining from the collected dealer location data a difference value representing a difference between: a first distance between one or more dealers of interest and a geographical region of interest; and a second distance between one or more competing dealers and the geographical region of interest,
  - determining from the collected historical vehicle sales transaction data a normalizing distance associated with a set of vehicle sales transactions in the geographical region of interest wherein determining the normalizing distance comprises evaluating, for the set of vehicle sales transactions in the geographical region of interest, a typical distance traveled by customers to purchase vehicles, and
  - dividing the determined difference value by the normalizing distance to generate the normalization metric, wherein the normalization metric comprises a competition zone index corresponding to the geographical region of interest,
- identifying competition zones associated with the one or more dealers of interest based on competition zone indices corresponding to each of the geographical regions of interest, wherein each of the competition zones includes one or more of the geographical regions of interest, and
- generating, by the vehicle data system in real-time, a performance assessment for the one or more dealers of interest based on the identified competition zones and presenting the performance assessment via an interface on a computing device connected to the vehicle data system.

14. The computer program product of claim 13,
- wherein the competition zone index corresponding to each geographical region of interest comprises a numeric value,
- wherein identifying the competition zones associated with the one or more dealers of interest comprises identifying geographical regions of interest having competition zone indices less than or equal to a first threshold as a backyard zone, identifying geographical regions of interest having competition zone indices greater than the first threshold and less than or equal to a second threshold as a competition zone, and identifying geographical regions of interest having competition zone indices greater than the second threshold as a conquest zone,
- wherein generating the performance assessment comprises
- determining a first number of sales made by the one or more dealers of interest in the conquest zone,
- determining a second number of sales made by dealers other than the one or more dealers of interest in the backyard zone,
- determining a number of net sales by the one or more dealers of interest, wherein the net sales is equal to the first number of sales minus the second number of sales, and
- generating a performance scorecard display including a visualization of at least the number of net sales by the one or more dealers of interest.

15. The computer program product of claim 13,
- wherein the competition zone index corresponding to each geographical region of interest comprises a numeric value,
- wherein the one or more dealers of interest comprises a plurality of dealers of interest,
- wherein, for each of the plurality of dealers of interest, and
- wherein generating the performance assessment comprises, for one or more of the geographical regions of interest:
- identifying a first set dealers of interest that have made sales in the one or more of the geographical regions of interest;
- identifying a number of sales made in the one or more of the geographical regions of interest by each of the first set of dealers of interest; and
- generating a competitive scorecard display including a visualization of the number of sales made in the one or more of the geographical regions of interest by corresponding ones of the first set of dealers of interest.

16. The computer program product of claim 13, further comprising the vehicle data system determining, for each of the geographical regions of interest, a corresponding close rate; and, for the one or more dealers of interest, storing the competition zone index and the close rate corresponding to each of the geographical regions of interest in a close rate data structure.

17. The computer program product of claim 13, wherein the normalizing distance comprises a median value of a set of distances corresponding to the set of vehicle sales transactions in the geographical region of interest.

18. The computer program product of claim 13, further comprising, after collecting the dealer location data and the historical vehicle sales transaction data from the one or more external data sources, the vehicle data system selecting a subset of the collected dealer location data and historical vehicle sales transaction data including distances used in the generation of the normalization metric and building a competition zone master table which stores the selected subset of the collected dealer location data and historical vehicle sales transaction data.

19. The computer program product of claim 13, wherein the normalization metric comprises a dealer competition zone (DCZ) metric for a specific dealer of interest and a specific make of vehicle in which, for each of the geographical regions of interest, a corresponding DCZ value is generated by the vehicle data system:
   determining from the collected dealer location data a difference value representing a difference between: a first distance between the specific dealers of interest and a geographical region of interest; and a second distance between a next-closest competing dealer and the geographical region of interest;
   determining from the collected historical vehicle sales transaction data the normalizing distance associated with a set of vehicle sales transactions corresponding to the specific make of vehicle in the geographical region of interest; and
   dividing the determined difference value by the normalizing distance to generate the DCZ value corresponding to the geographical region of interest.

20. The computer program product of claim 13,
   wherein the normalization metric comprises a customer competition zone (CCZ) metric for a first set of dealers with respect to a competing set of dealers and with respect to a specific make of vehicle in which, for each of the geographical regions of interest, a corresponding CCZ value is generated by the vehicle data system by:
   determining from the collected dealer location data a difference value representing a difference between: a first distance between a closest one the first set of dealers of interest and the geographical region of interest; and a second distance between a closest one of the competing set of dealers and the geographical region of interest;
   determining from the collected historical vehicle sales transaction data the normalizing distance associated with a set of vehicle sales transactions corresponding to the specific make of vehicle in the geographical region of interest; and
   dividing the determined difference value by the normalizing distance to generate the DCZ value corresponding to the geographical region of interest;
   wherein generating the performance assessment for the one or more dealers of interest based on the identified competition zones comprises:
   generating a first map of the geographical regions of interest corresponding to the first set of dealers, wherein the first map aggregates geographical regions of interest according to the corresponding DCZ values and indicates a first aggregated backyard zone, a first aggregated competition zone, and a first aggregated conquest zone;
   generating an updated first set of dealers by adding at least one dealer to the first set of dealers or subtracting at least one dealer from the first set of dealers;
   generating an updated CCZ value for each of the geographical regions of interest;
   generating a second map of the geographical regions of interest corresponding to the updated first set of dealers, wherein the second map aggregates geographical regions of interest according to the corresponding updated DCZ values and indicates a second aggregated backyard zone, a second aggregated competition zone, and a second aggregated conquest zone; and
   presenting visualizations of the first map and the second map via an interface on a computing device.

* * * * *